United States Patent
Ferrarese et al.

(10) Patent No.: US 8,876,115 B2
(45) Date of Patent: Nov. 4, 2014

(54) THREE-PIECE OIL-CONTROL RING FOR AN INTERNAL COMBUSTION ENGINE

(71) Applicants: MAHLE Metal Leve S/A, Jundiai (BR); MAHLE International GmbH, Stuttgart (DE)

(72) Inventors: Andre Ferrarese, Sao Paulo (BR); Rafael Antonio Bruno, Sao Paulo (BR)

(73) Assignees: MAHLE Metal Leve S/A, Jundiai (BR); MAHLE International GmbH, Stuttgart (DE)

( * ) Notice: Subject to any disclaimer, the term of this patent is extended or adjusted under 35 U.S.C. 154(b) by 0 days.

(21) Appl. No.: 13/952,145

(22) Filed: Jul. 26, 2013

(65) Prior Publication Data
US 2014/0035235 A1 Feb. 6, 2014

(30) Foreign Application Priority Data
Jul. 31, 2012 (BR) .............................. 102012019166

(51) Int. Cl.
*F16J 9/20* (2006.01)
*F16J 9/12* (2006.01)

(52) U.S. Cl.
CPC ........................................ *F16J 9/12* (2013.01)
USPC .......................................... 277/466; 277/434

(58) Field of Classification Search
CPC .................. F16J 9/20; F16J 9/00; F16J 9/06; F16J 9/063; F16J 9/16
USPC .......... 277/434, 435, 447, 449, 466, 445, 446
See application file for complete search history.

(56) References Cited

U.S. PATENT DOCUMENTS

| | | | |
|---|---|---|---|
| 3,628,800 A * | 12/1971 | Prasse | 277/463 |
| 4,722,535 A * | 2/1988 | Maeda et al. | 277/479 |
| 4,798,391 A | 1/1989 | Maeda | |
| 5,964,467 A * | 10/1999 | Hirata | 277/447 |
| 7,243,596 B2 * | 7/2007 | Usui et al. | 92/253 |
| 7,854,191 B2 | 12/2010 | Kariya | |
| 2004/0061291 A1 * | 4/2004 | Takiguchi et al. | 277/446 |
| 2006/0061043 A1 | 3/2006 | Takahashi et al. | |

* cited by examiner

*Primary Examiner* — Gilbert Lee
(74) *Attorney, Agent, or Firm* — Alston & Bird LLP

(57) ABSTRACT

A three-piece oil control ring is provided for use in a piston groove of an internal combustion engine. The ring comprises a first annular segment and a second annular segment, associated to an expanding element. The expander has a substantially annular shape and comprises a first end facing the internal wall of the groove when the ring is mounted on the piston and a second opposite end. The ring further comprises an intermediate portion having at least one protrusion for association with the segments. Still further, the first end exhibits first thickness value (E1), the second end exhibits second thickness value (E2) and the substantially intermediate portion exhibits third thickness value (E3), wherein the value of (E1) is substantially lower than the value of (E3) and lower or similar to the value of (E2), the difference between (E1) and (E3) being substantially higher than that between (E1) and (E2).

3 Claims, 1 Drawing Sheet

THREE-PIECE OIL-CONTROL RING FOR AN INTERNAL COMBUSTION ENGINE

CROSS-REFERENCE TO RELATED APPLICATION

This application claims priority to and the benefit of Brazilian Application No. BR102012019166-0, filed Jul. 31, 2012, the entire disclosure and contents of which is hereby incorporated by reference herein.

BACKGROUND

1. Technical Field

The present invention relates to a three-piece oil-control ring for use on the piston groove of an internal combustion engine, comprising a first upper/higher annular segment and a second lower annular segment, associated to an intermediate expanding element provided with a geometry that exhibits thickness, taken adjacent its internal end (smaller diameter) substantially smaller than the thickness taken in the region of association with the first and second annular segments.

The geometry of the expanding element prevents undesired contact with the inner wall and the upper/higher and lower edges (angles) defined by the piston groove, decreasing the tolerance accuracy required in the manufacturing process of this component. In this way, one achieves a reduction in the piston manufacture cost and a smaller number of incompatibilities between the expander and the groove, reducing to zero the occurrence of a situation called "pop-out", corresponding to the distance between the inner diameter of the ring when it is free, that is, not confined in the cylinder, with respect to the walls of the outer diameters close to the groove flanks where the ring is housed. The larger the pop-out the greater the risk of occurring inadequate mounting by causing the rings to deform and lock at the moment of inserting piston and rings into the cylinder.

2. Related Art

Internal combustion engines are energy transforming mechanisms used by most automotive vehicles, and comprise basically two main parts: one or more cylinder head and the engine block. On the base of the cylinder head(s) are located the combustion chambers (in Diesel engines the combustion chambers are generally at the piston heads) and in the engine block are located the cylinders and the crankshaft assembly. The crankshaft assembly is composed by pistons, rods and the crankshaft.

The engine converts the energy produced by combustion of the mixture (fuel and air) in the combustion chambers to mechanical energy capable of driving the wheels.

Since the driving force required for moving the automobile comes from the burning of the air/fuel mixture in the combustion chamber, and in order to ensure a homogeneous combustion, without burning oil, and still prevent the excessive passage of gases from the cylinder to the oil pan, it is necessary to use rings to provide good sealing of the clearance existing between the piston and the cylinder wall.

In most present day internal combustion engines that operate according to the Otto and Diesel cycles three rings are used, two of which being compression rings and one being oil control ring (scraper). The compression rings have the function of preventing the passage of gases from the combustion into the oil pan and the oil ring has the function of scraping the excess of oil from the cylinder wall and return it to the oil pan, controlling the thickness of the oil film, so that the operation of the engine will take place within the design and operation premises.

Another important function of the rings is serving as a bridge for transmitting heat from the piston to the cylinder wall/jacket, where heat dispersion occurs through the cooling system.

The oil scraping rings may be of one, two or three pieces. The present solution has been developed in the form of a three-piece ring that, as a rule, has first upper/higher annular segment and second lower annular segment, associated to an intermediate expanding element, which presses the upper/higher and lower segments against the cylinder wall in a controlled manner. The force exerted by the expanding element, which is nothing more than a resilient element, is calculated so that the oil film on the cylinder wall will have the desired thickness.

Although the 3-piece oil scraping rings are quite specified by the engine designers, there are a few disadvantageous characteristics coming from the constitution thereof, the greatest of which being the need to design the expanding element so that it will never interfere with the inner piston wall and the upper/higher and lower edges (angles) defined by the piston groove (the third groove, farther away from the groove).

This is achieved, in most cases, by applying a more reduced tolerance variation, namely 0.3 millimeter in the dimensions of the upper/higher and lower groove borders. Starting from this low dimensional variation, the expanding element is designed so that its proportions, under consideration of the tolerances in manufacturing it, will not cause undesirable interference with the groove in its most critical dimension, in view of the tolerance variation. In other words, groove and expander should be sized so that, even in the most critical situation of interference, no interference will occur.

Due to this kind of sizing, an opposite situation may occur, when the dimensions of groove and expander are such that the opposite situation of maximum clearance between them will occur, which may lead to the undesirable phenomenon of "pop-out", mentioned above.

There are various prior techniques referring to three-piece oil scraping rings, proposing improvements on this constructive concept, some of which are briefly listed hereinafter.

Document U.S. Pat. No. 7,854,191 relates to a three-piece oil scraping ring, designed to reduce the consumption of lubricating oil and to increase the sealing properties. The expanding element has support portions (resting protrusions) to enable positioning and fixing of the two annular segments. In order to enable the ring to perform as desired, the resting protrusions exhibit an angle between 10 and 20 degrees with the vertical and a geometric relationship 2X/Y between 0.04 and 0.15, wherein 2X corresponds to the projecting length of a respective support protrusion of the segment in the axial direction and Y is the distance between the distal end faces of the protrusions in the axial direction.

Document US 2006/0061043 relates to a 3-piece oil scraping ring, the expander of which has protrusions (which are in contact with the annular segments) made from austenitic stainless steel and coated with a nitrided coating layer.

Finally, document U.S. Pat. No. 4,798,391 relates to a 3-piece oil scraping oil, the expander of which exhibits slots and ribs that contribute to obtaining a desired rigidity value, reducing the consumption of lubricating oil of the engine equipped therewith.

The three documents cited above show different approaches to the improvement of three-piece oil scraping rings, with a view to increase its performance, which has the result of reducing the consumption of lubricating oil. But there is no concern, in any of these documents, about the shape of the cross section of the expander with regard to the dimension tolerance of the groove and the occurrence of the pop-out phenomenon, which undoubtedly bring drawbacks while assembling the engine.

Until the present moment, no three-piece oil scraping ring had been developed with an expander designed geometrically to prevent the need for great tolerance control of the piston groove, while eliminating the occurrence of the pop-out phenomenon.

BRIEF SUMMARY

Various embodiment of the present invention have the objective of providing a three-piece ring for using in the piston groove of an internal combustion engine, provided with an expanding element having a geometry that prevents undesirable contact with the inner wall and the upper/higher and lower edges (angles) defined by the piston groove, without the need for much reduced tolerance variation in the manufacturing process of this component, reducing to zero the occurrence of "pop-out" during the assembly of the engine and achieving a reduction on the piston manufacture cost.

Various embodiment of the present invention have the objective of providing a three-piece ring for using in the piston groove of an internal combustion engine that, besides all the advantages mentioned in the preceding paragraph, guarantees an optimum performance as far as (reduced) consumption of lubricating oil, durability and sealing capability are concerned.

The objectives of the various embodiments of the present invention are achieved by means of a three-piece oil control ring for use in the piston groove of an internal combustion engine, comprising first annular segment and second annular segment, associated to an expanding element, wherein the expander has a substantially annular shape and comprises a first end facing the inner wall of the groove when the ring is mounted on the piston and a second opposite end.

The ring further comprises a substantially intermediate portion having at least one protrusion for association with the first and second annular segments.

The first end exhibits first thickness value (E1), the second end exhibits second thickness value (E2) and the substantially intermediate portion (E2) exhibits third thickness value (E3), wherein the value (E1) is substantially lower than the value (E3) and similar or lower than the value (E2), the difference in values between (E1) and (E3) being substantially higher than the difference in values between (E1) and (E2).

The above-mentioned characteristics, in addition to the other aspects of the present invention, will be better understood by reference to the detailed description of the figures hereinafter.

BRIEF DESCRIPTION OF THE SEVERAL VIEWS OF THE DRAWING(S)

Various embodiment of the present invention will now be described in greater detail with reference to an example of embodiment represented in the drawings. The figures show:

DETAILED DESCRIPTION OF VARIOUS EMBODIMENTS

Figure 1:
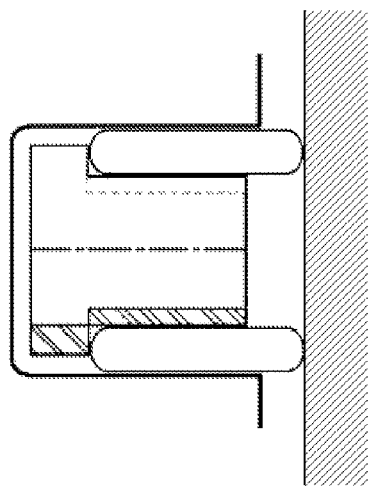
FIG. 1 is a cross-sectional view of a three-piece oil scraping ring of the prior art and shown in the piston groove in normal condition, wherein there is no interference of the inner end of the expander with the groove edges.
Figure 2:
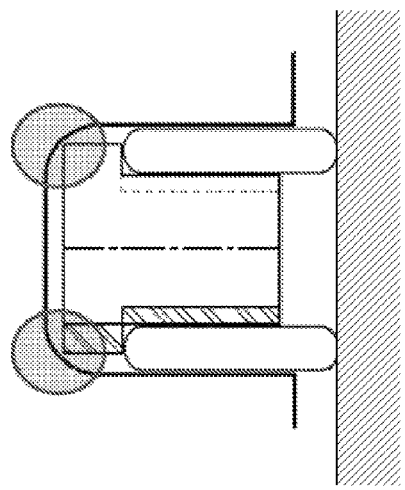
FIG. 2 is a cross-sectional view of a three-pieces oil scraping ring of the prior art, mounted ion the piston groove in normal condition, in an undesirable situation, in which, due to undesirable tolerance deviations, but unfortunately possible, there is interference of the inner end of the expander with the groove edges.

FIGS. 1 and 2 show a three-piece oil scraping ring of the prior art, positioned inside the third piston groove (shown in part). As can be seen, the three-piece ring comprises a first upper/higher annular segment and a second lower annular segment, associated to an expanding element arranged intermediately, which presses the upper/higher and lower segments against the cylinder wall in a controlled manner.

Although this type of ring is widely used nowadays and has been improved together with the development of internal combustion engines that operate according to the Otto and Diesel cycles, until now it was necessary to design the expanding element so that it would never interfere with the inner wall and the upper/higher and lower edges (angels) defined by the piston groove.

As a rule, one designed the expanding element aiming at the determination of a tolerance variation of 0.3 millimeter in the dimensions of the upper and lower groove edges as a crucial premise of design. The dimensions of the expander were such that they did not cause undesirable interference with the groove in its most critical dimension, under consideration of the maximum tolerances in manufacturing it.

In the event of an incorrect sizing of the expander, there might be a critical situation in terms of interference, in which the inner end thereof would interfere with the inner wall and the upper/higher and lower edges (angles) defined by the groove, which might cause reduction of durability of the component, or even, in extreme cases, the collapse of the ring, requiring a quite expensive maintenance of the engine. This critical situation is illustrated in FIG. 2.

The sizing of the expander as it used to be made causes a side problem when the dimensions of the groove and expander are such that a situation of maximum clearance between them occurs, which may lead to the undesirable "pop-out" problem mentioned before.

Until now, nobody had developed a three-piece oil scraping ring to solve the problem of tolerance interference and "pop-out" by a different approach, starting from a more elastic and conceptual change of the expander other than the mere sizing and control of the tolerance parameters. With this new concept, the applicant created a ring that has reduced to zero both the occurrence of interference of the expander with the inner wall of the groove and the undesirable "pop-out" situation.

Figure 3:
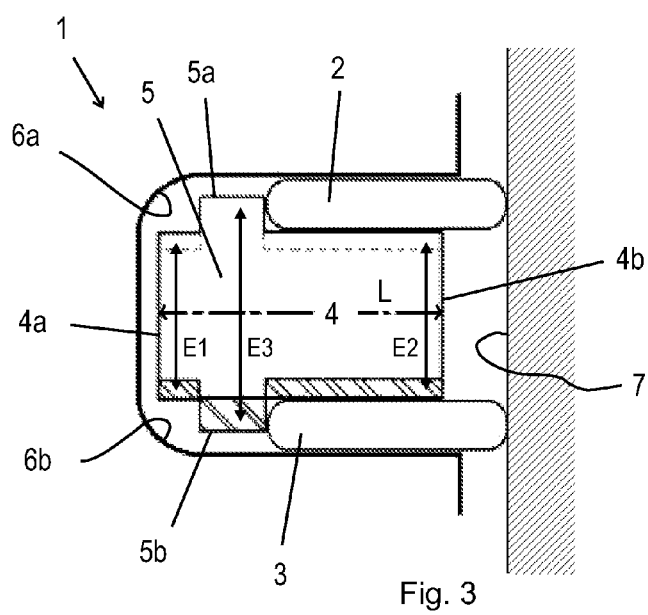
FIG. 3 is a cross-section view of the three-piece oil scraping ring of the present invention, mounted in the piston groove.

Now, in a detailed description of the invention, FIG. 3 illustrates a non-limiting embodiment of the ring 1 developed by the applicant.

The ring 1 comprises first annular segment 2 and second annular segment 3, which are substantially horizontal and parallel to each other, associated to an expending element 4.

Evidently, the specific dimensions of the segments 1, 2, the material from which they are made and the possible surface coating which they may contain are characteristics that do not influence the protection scope of the invention, varying, for instance, as a function of the type of fuel burned by the engine on which they are used and still of design parameters and operation of the engine.

The expanding element 4, in turn, is the great innovation of the present invention. It also has a substantially annular shape and, as can be seen in FIG. 3, comprises a first end 4a facing the inner wall of the groove when the ring is mounted on the piston, a second opposite end 4b, and a substantially intermediate portion 5 comprising at least one protrusion 5a, 5b (an upper/higher one and a lower one, respectively) for association with the first and second annular segments 2,3.

When the ring 1 is mounted, each of the protrusions 5a, 5b serves as an horizontal stop for the respective annular segment 2, 3. Taking the case of the first annular segment 2, FIG. 3 shows perfectly the positioning in which it is, constricted between the upper/higher groove surface, the body of the expanding element and the upper/higher protrusion 5a.

Thus, the second lower annular element 3 is constricted between the upper groove surface, the expanding element body and the lower protrusion 5b.

Explaining in greater detail, the side surface of each of the segments 2, 3 is operatively associated to a substantially side wall of a respective protrusion 5a, 5b. Thus, when the piston/ring assembly is mounted inside the cylinder of an engine, the expander 4 presses, in a controlled way (as a function of the elastic force applied by it as a resilient element), the upper and lower segments 2, 3 against the cylinder wall (shown in FIG. 3 with reference number 7).

The force exerted by the expanding element is calculated so that the oil film on the cylinder wall will have the desired thickness, further preventing excess of pressure that might cause accelerated deterioration of the segments or of the cylinder wall itself.

The great innovation of the expander is that, at the same time when the two protrusions 5a, 5a exist for guaranteeing adequate contact of the segments 2, 3 with the cylinder wall, the first end 4a, which is the one facing the inner wall of the piston groove, has a considerable smaller thickness that the intermediate portion 5 (where the protrusions 5a, 5b are located) and smaller than the total height of the piston groove.

As can be seen in FIG. 3, the difference between the piston height and the thickness of the first end 4a is considerable, making it impossible for the latter to contact the groove at the upper and lower edges (angles) defined farther above and shown with reference numbers 6a, 6b.

In a more detailed description and in accordance with FIG. 3, the first end 4a exhibits a first thickness value E1, the second end 4b exhibits a second thickness value E2 and the substantially intermediate portion 5 exhibits a third thickness value E3.

Evidently, the thickness value E3 of the intermediate layer 5 is higher due to the main function of the protrusions 5a, 5b, namely: they serve as a stop preventing horizontal movement of the segments 2, 3 into the groove and force them against the cylinder wall starting from the movement of the expander.

However, the thickness E1 of the first end 4a is considerably lower than the thickness of the intermediate layer E3, unlike what happens with the expanders of prior-art expanders, representatively shown in FIGS. 1 and 2.

Moreover, it should be noted that the thickness E1 of the first end 4a of the expander 4 is substantially similar to the value of the thickness E2 of the second end 4b of the expander 4. This second end should compulsorily be lower than the E3, so that the protrusions 5a, 5b can exist and the segments 2, 3 can remain constricted between them, the groove and the expander body.

In the event that E1 is substantially analogous to E3, the thus configured ring comes close to the presently known products (see FIGS. 1 and 2) and departs from the presently proposed concept, since the interference with the grooves as illustrated in FIG. 2 becomes against a real possibility. For this reason, in the present concept, besides the fact that the value (E1) is substantially lower than the value (E3) and substantially similar to the value of (E2), the difference in values between (E1) and (E3) is substantially greater than the difference in values between (E1) and (E2), configuring a relationship that eliminates a minor variation in thickness E1 with respect to E3.

Evidently, the measurement L of the width of the cross-section of the expander 4 should be determined so as to present the first end 4a from touching the inner groove wall, however small the thickness El is. However, this sizing is already effected for the rings presently in used.

With the innovative geometry applied to the expander 4, one prevents contact of the first end 4a with the upper and lower edges (angles) defined by the piston groove, making it unnecessary to use processes for making the piston with reduced tolerances to groove dimensions, which are quite expansive and increment considerably the cost of this piece, guaranteeing a smaller number of incompatibilities between the expander and the groove, reducing to zero the occurrence of "pop-out".

Like what was said for the segments 2, 3, the material from which the expander is made and the possible surface coating which it may have are characteristics that do not influence the protection scope of the invention, varying, for instance, as a function of the type of fuel burned by the engine on which they are used and still due to design parameters and operation of the engine.

An exemplary embodiment having been described, one should understand that the scope of the present invention embraces other possible variations, as for example, the use of surface treatments and ceramic and metallic coverings, with a view to improve the characteristics of resistance to wear, corrosion and decrease of the friction forces, being limited only by the contents of the accompanying claims, which include the possible equivalents.

That which is claimed:

1. A three-piece oil control ring for use in a piston groove of an internal combustion engine, said ring comprising:
   a first annular segment (2); having a first end facing the internal wall of the piston groove; and
   a second annular segment (3), parallel to and spaced apart a first distance from the first annular segment (2) and having a first end facing the internal wall of the piston groove, said first and second annular segments (2, 3) being associated with an expanding element (4), said expanding element (4) having a substantially annular shape and comprising a first end (4a) facing the internal wall of the piston groove when the ring is mounted on the piston and a second opposite end (4b),
   wherein:
      the expanding element (4) further comprises a substantially intermediate portion (5) positioned intermediate the first end (4a) and the second opposite end (4b) of the expanding element, said substantially intermediate portion (5) comprising at least two protrusions (5a, 5b), at least a portion of each of the at least two protrusions being in contact with the first ends of the first and the second annular segments (2, 3), respectively;
      the first end (4a) exhibits a first thickness value (E1), the second end (4b) exhibits a second thickness value (E2) and the substantially intermediate portion (5) exhibits a third thickness value (E3), third thickness value (E3) being greater than the first distance such that a portion of the at least two protrusions (5a, 5b) contacts the first ends of the first and the second annular segments (2, 3), respectively;

the value (E1) is substantially lower than the value (E3) and at least one of lower or similar to the value (E2); and a difference between the value (E1) and the value (E3) is substantially higher than the a difference between the value (E1) and the value (E2).

2. The ring according to claim 1, wherein (E1) and (E2) exhibit the same value.

3. The ring according to claim 1, wherein the thickness value of (E1) is substantially lower than the thickness value of (E3) so as to prevent the first end (4a) of the expander (4) from contacting the inner wall and the upper and lower edges (angles) defined by the piston groove.

\* \* \* \* \*